United States Patent [19]

Suzaki

[11] 4,009,950
[45] Mar. 1, 1977

[54] MOTION PICTURE PROJECTION APPARATUS WITH FILM FEEDING SPEED CHANGING APPARATUS

[75] Inventor: Kuniyoshi Suzaki, Machida, Japan

[73] Assignee: Canon Kabushiki Kaisha, Tokyo, Japan

[22] Filed: Jan. 2, 1975

[21] Appl. No.: 538,163

[30] Foreign Application Priority Data

Jan. 8, 1974   Japan ............................... 49-5507

[52] U.S. Cl. .............................. 352/166; 352/168; 352/180; 74/217 R
[51] Int. Cl.² ......................................... G03B 1/00
[58] Field of Search ............ 352/14, 166, 180, 168; 74/217 R, 217 S, 217 CV

[56] References Cited

UNITED STATES PATENTS

| | | | |
|---|---|---|---|
| 955,920 | 4/1910 | Stevens | 74/217 R |
| 2,742,793 | 4/1956 | Askren | 352/180 |
| 3,165,002 | 1/1965 | Hatch | 74/217 R |
| 3,597,056 | 8/1971 | Sasaki | 352/14 |

*Primary Examiner*—Monroe H. Hayes
*Attorney, Agent, or Firm*—Toren, McGeady and Stanger

[57] ABSTRACT

The present invention relates to a motion picture projection apparatus with film feeding speed changing apparatus which is characterized in that the apparatus presents a driving motor for rotating the first pulley member on which at least more than two pulley parts to be used in accordance with the projection speed are formed and a film feeding apparatus to be operated in cooperation with the second pulley on which at least more than three pulley parts have diameters which are different from each other. This is done in such a manner that a different pulley part is used even for the same film speed in accordance with the frequencies of the current source. A belt to be selectively provided between one of the pulley groups formed on the first pulley member and one of those formed on the second pulley member is included and also included is a changing means for selectively changing the position of the belt in such a manner that the belt is provided between other pulleys of the above mentioned pulley groups so that, by changing the position of the belt on said pulley parts in accordance with the frequencies of the current source and with the necessary film speed by means, of the above mentioned changing means a certain predetermined film speed independent of the frequencies of the current source can be obtained while a certain film speed can be changed into another certain predetermined film speed.

14 Claims, 3 Drawing Figures

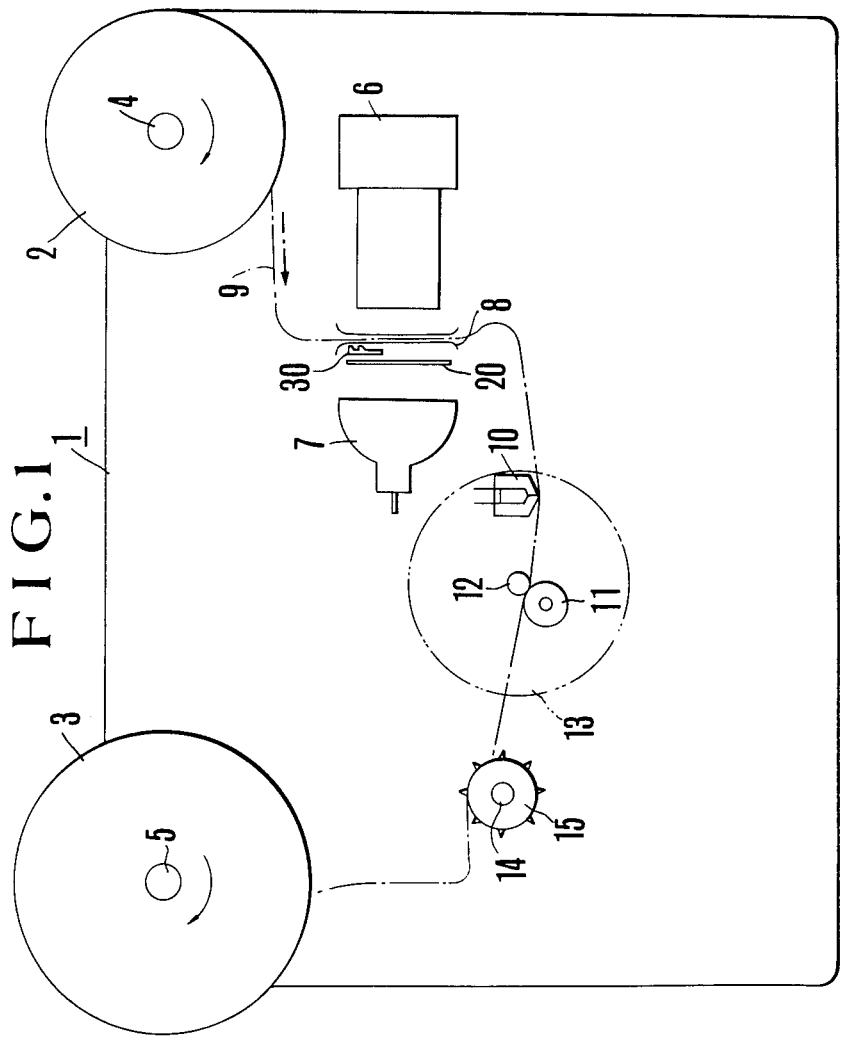

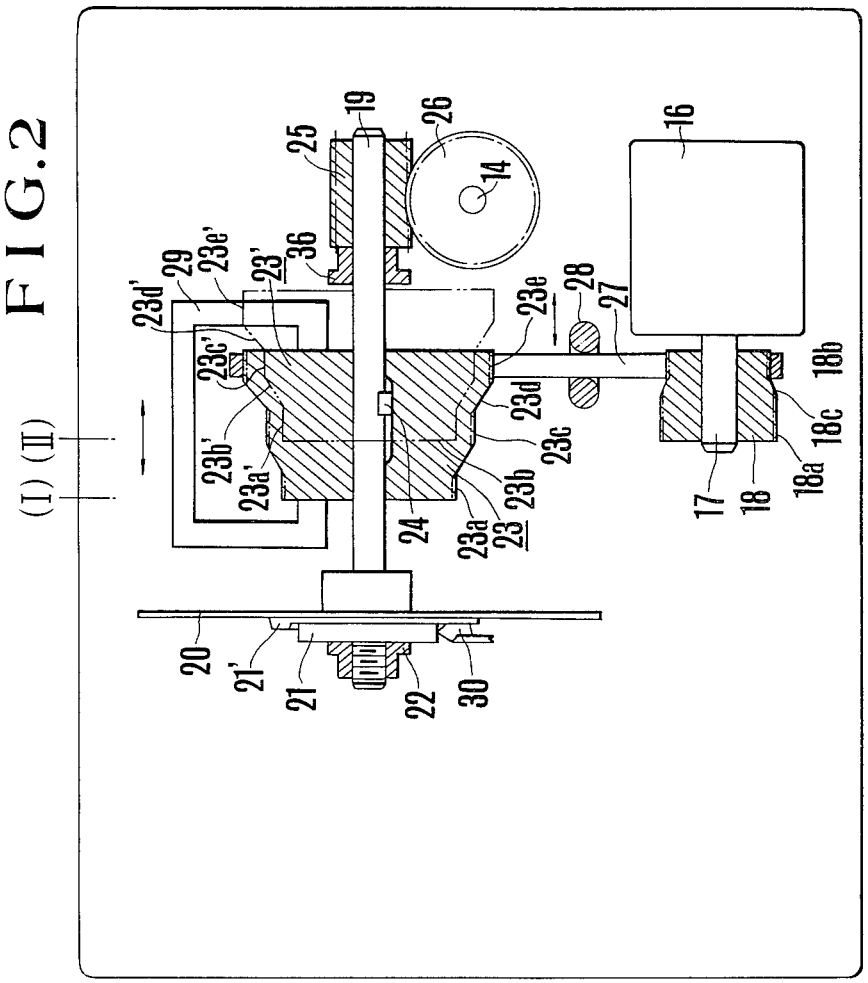
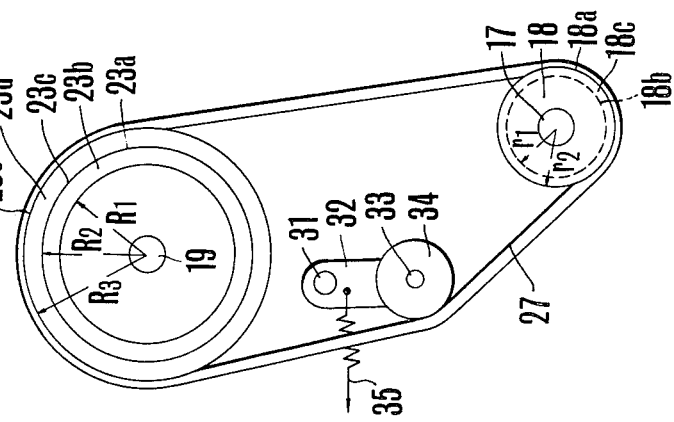

MOTION PICTURE PROJECTION APPARATUS WITH FILM FEEDING SPEED CHANGING APPARATUS

BACKGROUND OF THE INVENTION

1. Field of the Invention

The present invention relates to a motion picture projector apparatus with film speed changing apparatus.

2. Description of the Prior Art

Generally speaking, for the driving source of a motion picture projection apparatus, an induction motor or the like is mainly used. The rotation speed n of this motor is generally expressed by the equation $n = 120\ f/p$ (rpm) where $p$ represents the number of poles and $f$ the frequency of the current source. As is clear from the above mentioned equation, the rotation speeds are different from each other when an induction motor is driven by a current source having different frequencies. However, there are no standard frequencies of the commercial current source in the world, for example, in the United States, the frequency of the commercial current source is 60 Hz while in Europe that of the commercial current source is 50 Hz.

Therefore, when the motion picture projection apparatus with the film feeding mechanism, whose induction motor is so designed that the film can be fed at a proper speed with the commercial current source of 60 Hz, is driven with the commercial current source of 50 Hz, the speed of the rotation is smaller by one sixth than when the induction motor is driven with the commercial current source of 60 Hz. In consequence, the speed of the pictures to be projected is lowered proportionally so that the motion picture projected does not seem natural. Even if such deleterious influence upon the motion picture projected can be tolerated, there may occur a problem with the sound motion picture projection apparatus by means of which sound regenerating means the sound information stored in one part of the film is picked up and regenerated at the same time.

Therefore, in order to solve the above mentioned problem today, it is proposed to alter the ratio of the transmission from the induction motor to the film feeding mechanism in accordance with the frequencies of the commercial current source then used. Hereby the conventional method to alter the ratio of the transmission is for example, to fix a pulley with V-shaped or U-shaped groove on the motor shaft respectively on the rotary shaft of the film feeding mechanism and to provide between these pulleys a properly shaped belt so as to adapted in the grooves of the pulleys in such a manner that the driving power is transmitted from the motor to the film feeding mechanism, whereby there are following various methods:

a. a method to exchange either the pulley fixed on the motor shaft or that fixed on the rotary shaft of the film feeding mechanism for a pulley with a groove of different diameter, changing at the same time the belt or a method to exchange either the pulley fixed on the motor shaft or that fixed on the rotary shaft of the film feeding mechanism for a pulley with a groove of different diameter, without changing the belt, or b. as the method not to put out the pulley fixed on the rotary shaft from the shaft each time, a pulley on which a plural number of grooves with different diameters are formed as one body along the axial direction of the rotary shaft is fixed on the rotary shaft in advance and only the position of the pulley grooves on which the belt is to be provided is changed in accordance with the frequencies of the commercial current source without taking out the pulley from the shaft.

However, according to the conventional method, when the apparatus is used at a place where the frequency of the commercial current source is different, the cover has to be taken off every time when the frequency differs. Further, in the former case, the pulley has to be completely exchanged for the other pulley so that, not only is it troublesome, but also the spare pulleys have to be prepared because at least more than two kinds of pulleys have to be reserved. Further even in the latter case, after the cover having being taken off, the position of the belt is changed, which is also troublesome.

Further, quite recently in order to meet the demand for a motion picture projection apparatus whose projection speed, namely the number of pictures per second, can be altered in order to increase the efficiency of the motion picture projection apparatus. Such apparatus has begun to appear on the market.

The method to change the number of the pictures per second when a motion picture projection apparatus in which the frequency can not be changed easily, namely the pulley fixed on the rotary shaft of the motor, is completely changed is to form the groove of the pulley fixed on the rotary shaft flat and at the same time to form the pulley fixed on the rotary shaft of the film feeding mechanism in such a manner that a plural number of the pulley parts with flat engaging parts on which the belt is provided extends along the axial direction of the rotary shaft. The parts between the pulley parts are tapered whereby the number of pictures per second can be altered by engaging the belt with the pulley parts of different diameter in accordance with the number of pictures per second to be chosen.

Further, a motion picture projection apparatus, which presents a number of picture changing mechanisms by means of which the frequency change for adjusting the speed of the induction motor under the influence of the difference of the frequency and the change of the number of picture per second are possible also exists, whereby the driving power is not transmitted from the motor directly to the film feeding mechanism by means of one belt but is transmitted to the third rotary shaft provided between the rotary shaft of the motor and that of the film feeding mechanism by means of a belt and at the same time from the third rotary shaft to the rotary shaft of the film feeding mechanism by means of another belt, namely the change frequency is effected between the rotary shaft of the motor and the third rotary shaft while the change of the number of picture is effected between the third rotary shaft and the rotary shaft of the film feeding mechanism. In consequence, as a result of these methods, many components are necessary so that not only the mechanism becomes complicated but also the manufacturing cost becomes high. Further, the driving power is transmitted from the motor to the film feeding mechanism in two steps, namely by means of two belts so that the loss of energy due to the slip between every belt and due the rotary shaft and to the contact of large area between each belt and the rotary shaft is remarkable. There it becomes necessary to provide a motor having large capacity taking the above into consideration, which results in further lack of economy.

SUMMARY OF THE INVENTION

The first purpose of the present invention is to offer a motion picture projection apparatus with a film feeding speed changing apparatus of simple mechanism without having the shortcomings of conventional apparatus.

The second purpose of the present invention is to offer a motion picture projection apparatus in which the frequency change for adjusting the speed of the induction motor under the influence of the difference of the current source used and the change of the number of pictures per second are mechanically possible.

The third purpose of the present invention is to offer a motion picture projection apparatus with a film feeding speed changing apparatus in which the frequency changing and the change of the number of pictures per second are easily possible by means of operation from outside.

The fourth purpose of the present invention is to offer a motion picture projection apparatus with a film feeding speed changing apparatus in which the loss of the driving power from the driving motor is small.

Other purposes of the present invention will be disclosed in the following explanation according to the attached drawings.

BRIEF DESCRIPTION OF THE DRAWINGS

FIG. 1 shows a general composition of a sound motion picture projection apparatus.

FIG. 2 shows a front view of an embodiment of the film feeding speed changing apparatus of the present invention which is applicable to the sound motion picture projection apparatus as shown in FIG. 1 and in which the frequency and the number of pictures can be changed, whereby a part of the film feeding speed changing apparatus is shown in section.

FIG. 3 shows a plane view of the belt driving mechanism of the film feeding speeds changing apparatus of the present invention as shown in FIG. 2.

DESCRIPTION OF THE PREFERRED EMBODIMENT

FIG. 1 shows a general composition of a sound motion picture projection apparatus in which the film feeding speed changing apparatus of the present invention can be built, whereby 1 is the body of the sound motion picture projection apparatus, 2 the reel for supplying film being dismountably engaged on the film supplying shaft 4, 3 the winding up reel being dismountably engaged on the film winding up shaft 5, 6 the optics for projection, 7 the light source for projection, 8 the aperture part composing the film gate part, 9 the film, 10 the magnetic head, 11 the pinch roller, 12 the capstan, 13 the fly-wheel for rotating the capstan 12 at a constant speed, 14 the sprocket shaft for rotating the sprocket 15 and 20 the rotary shutter member being provided between the light source 7 for projection and the film gate member so as to selectively permit the light beam coming from the light source 7 for projection to enter into the above mentioned aperture part 8 while rotating. 30 is the film feeding claw member which is so designed as to feed the film 9 to the aperture 8 in functional engagement with the rotary shutter member 20, while the rotary shutter member 20 prevents the light beam coming from the light source 7 for projection from entering into the above mentioned aperture part and not to feed the film to the aperture part 8, while the rotary shutter member 20 allows the light beam coming from the light source 7 for projection to enter into the above mentioned aperture.

The above sound motion picture projection apparatus, is so designed that the film 9 coming from the film supplying reel is continuously and intermittently fed to the aperture part 8 by means of the film feeding claw, the sound information stored in advance on the side of the film 9 is picked up by means of the magnetic head 10 and then the film is continuously fed at a constant speed clamped between the pinch roller 11 and the capstan 12 so as to be wound up by the film winding reel 3 through the sprocket 15.

FIG. 2 shows a front view of an embodiment of the film feeding speed changing apparatus of the present invention which is applicable to the sound motion picture projection apparatus shown in FIG. 1 and in which the frequency and the number of pictures can be changed, whereby 16 is an induction motor which can be operated with the commercial frequency of for example, 50 Hz and 60 Hz, 17 the shaft of the motor 16, 18 the pulley with steps fixed on the motor shaft 17 so as to rotate with the shaft 17 as one body. The above mentioned pulley 18 presents the stepped parts 18a and 18b which has the diameters different from each other and are connected with each other by the tapered part 18c into one body. These pulley parts 18a and 18b are for changing the number of pictures. 19 is the shutter shaft rotatably born on the bearings 22 and 36 on which shaft the shutter blade 20, the control cams 21 and 21' for controlling the above mentioned film feeding claw member 30 and the worm gear are adapted. The above mentioned control cams 21 and 21' are so provided as to be normally in touch with the above mentioned film feeding claw member 30, whereby the control cam 21 is intended to strip off the film from the film feeding claw member 30 during the film feeding operation, while the control cam 21' is intended to selectively engage the film feeding claw into the perforations in the film. 23 is the pulley born on the shutter shaft 19, which pulley is selectively slidable along the lengthwise direction of the shutter shaft 19 and rotatable with the shutter shaft 19 as one body because the rotation is prohibited by the key 24. Further, the pulley 23 consists of the pulley parts, 23a, 23c and 23e whose diameters are different from each other and which are connected by means of the tapered parts 23b and 23d with each other into one body. 26 is the worm wheel gear adapted on the sprocket shaft 14 which worm wheel gear is so provided as to be normally in engagement with the worm gear 25 in such a manner that the shutter shaft 19 rotates synchronously with the sprocket shaft 14. 27 is the flat belt provided between the pulley 18 and the pulley 23 by means of which flat belt the rotation of the pulley 18 driven by the rotation driving power of the induction motor 16 is conveyed to the pulley 23 so as to rotate the shutter shaft 19. 28 is the ring shaped belt position changing member in which the belt is guided so as to translate the belt 27 along the axial direction of the shutter shaft 19 and of the motor shaft 17, whereby, when the belt 27 is selectively translated along the direction of the arrow by the operation from outside by means of the above mentioned belt position changing member 28, the position of the pulley 18 and that of the pulley 23 are changed in such a manner that the film feeding speed is changed. 29 is a frequency adjusting member composing a part of the frequency changing means by means of which the influence upon the speed of the motor due to the difference of the frequency of the commercial electricity is compensated by translating the pulley 23 along the axial direction on the shutter shaft 19 in accordance with the frequency to be applied to the motor.

FIG. 3 shows a plane view of the belt driving mechanism of the film feeding speed changing apparatus shown in FIG. 2, of the present invention, whereby 32 is the belt pressing member whose one end is rotatably born on the shaft 31 fixed on the body 1 and whose other end presents a roller 34 rotatably born on the rotary shaft 33 rotatably born on the above mentioned belt passing member 32. Further, the spring 35, by means of which the roller 34 usually pushes the belt 27 outwards, forms the belt tensioning means for keeping the belt 27 between the pulley 18 and the pulley 23 always in tense stated.

Further, between the diameters $r_1, r_2 \ldots$ of the pulley parts 18a, 18b of the pulley 18 and the diameters $R_1, R_2, R_3 \ldots$ of the pulley parts of the pulley 23 there exists the following relation:

$$S = r_n/R_n \cdot M$$

whereby $S$ the speed of rotations of the pulley 18, $M$ the speed of rotation of the pulley 23, $r_n$ the diameter of the pulley part of the pulley 18 and $R_n$ the diameter of the pulley 23. It goes without saying that the speed of rotation of the motor will be completely proportional.

Below the operation of thus composed film feeding speed changing apparatus of the present invention will be explained.

In the embodiment shown in FIGS. 2 and 3, of the film feeding speed changing apparatus of the present invention, two kinds of the frequencies of the electric current, namely 50 Hz and 60 Hz, can be utilized while two kinds of numbers of pictures per unit time, namely 18 pictures/second and 24 pictures/second can be switched over from the one to the other. The ratio of the diameter of the pulley part 18a to that of the pulley part 18b of the pulley respectively the ratio of the diameter of the pulley part 23a to that of the pulley part 23c, and the ratio of the diameter of the pulley part 23c to that of the pulley part 23e are so chosen to satisfy the above mentioned relation, namely $S = r_n/R_n \cdot M$ as follows.

18a : 18b = 1 : 0.9

23a : 23c : 23e = 1 : 1.2 : 1.44

The film feeding speed changing apparatus whose pulleys are composed in the relation as mentioned above can be equally utilized no matter whether the frequency of the electric current is 50 Hz or 60 Hz, by simply changing the position of each pulley part of the pulleys 18 and 23 bearing the belt 27. The pulley 23 assumes the position (I) in FIG. 2 (shown in full line) by means of the frequency adjusting means 29 in case the current source adopted for the motor is of 50 Hz and assumes the position (II) in FIG. 2 (in dotted line) in case the current source is of 60 Hz. Hereby 23a, 23b', 23c', 23d', and 23e' respectively show the position of pulley parts 23a, 23b, 23c, 23d and 23e when the pulley 23 is translated into the position (II).

The state shown in full line in FIG. 2 shows the state when the belt 27 is in engagement with the part 23e of the pulley 23 and with the part 18b of the pulley 18, namely the projection can be effected at 18 pictures per second with the current source of 60 Hz. In order to bring the above mentioned state into that in which the projection can be effected at 18 pictures per second with the same current source, the belt position changing member 28 is, being operated from outside, moved to the left in FIG. 2 in such a manner that due to the translation force of the above mentioned belt position changing member 28, the belt 27 is also translated to the left in the drawing, whereby the belt 27 is moved from the pulley part 18b to the part 18a through the part 18c on the pulley 18 and from the pulley part 23e to the part 23c through the part 23d on the pulley 23. Thus the translation of the pulley is automatically carried out by means of the belt position changing member 28 in such a manner that the projection can be effected at 24 pictures per second with the current source of 60 Hz.

So far the case where only the number of the pictures per second is changed while the frequency is left unchanged has been explained. Below, the case where the frequency is also changed from 60 Hz to 50 Hz while the number of the pictures per second is changed will be explained. When the frequency of the current source is changed the speed of rotation of the motor is also changed as explained above, so that the pulley 23 is translated into the position (II) shown in dotted line in FIG. 2 by operating the frequency adjusting member 29. Before this operation, the projection was carried out at the speed of 24 pictures per second with 60 Hz so that the belt 27 is in engagement with the pulley part 18a on the pulley 18. Hereby the pulley 23 is translated to the position (II) in FIG. 2, when the belt 27 is brought in the engagement with the pulley part 23a through the tapered part 23d, the pulley part 23c and the tapered part 23b. Namely, the belt 27 is now in engagement with the pulley part 18a of the pulley 18 and with the pulley part 23a of the pulley 23 in such a manner that the projection can be effected at the speed of 24 pictures per second with 50 Hz. Further, in order to change the speed of projection from 24 pictures per second to 18 pictures per second, the belt position changing member 28 is operated from outside so as to be translated to the right in the drawing in such a manner that due to the translating force of the above mentioned belt position changing member 28 the belt 27 is also translated to the right in the drawing whereby the belt 27 is translated from the pulley part 18a of the pulley 18 to the pulley part 18b through the tapered part and from the pulley part 23a of the pulley 23 to the pulley part 23c through the tapered part 23b. Namely, the switching over of the pulley can automatically be carried out by means of the belt position changing member 28 in such a manner that the projection can be effected at the speed of 18 pictures per second at 50 Hz.

In order to bring back the frequency from 50 Hz to 60 Hz, the frequency adjusting member 29 is again operated from outside in such a manner that the pulley 23 is brought back into the position (I) in FIG. 2, whereby the belt 27 is engaged with the pulley part 23e of pulley 23 and with the pulley part 18b of the pulley 18, namely the projection can be carried out at the speed of 18 pictures per second at 60 Hz.

As explained above, the rotational speed of the motor influenced by the difference of the frequency can be simply and mechanically adjusted by means of the film feeding speed changing apparatus of the present invention and conveyed to the film feeding mechanism whereby the combination of the belt 27 and various pulley parts of the pulleys 18 and 23 is chosen in such a manner that the ratio of the diameter of the pulley part 18a of the pulley 18 to that of the pulley part 18b is 18a : 18b = 1 : 0.9 while the ratio of the diameter of the pulley part 23a of the pulley 23 to that of the pulley part 23c and 23e is 23a : 23c 23e = 1 : 1.2 : 1.44. The combination for the speed of 18 pictures per second and of 24 pictures per second and the frequency of 50 Hz and 60 Hz is given in Table 1.

Table 1

| Speed | 18 pictures/sec. | | 24 pictures/sec. | |
|---|---|---|---|---|
| Pulley | Pulley 18 | Pulley 23 | Pulley 18 | Pulley 23 |
| Frequ-  60 Hz | 18b | 23e | 18a | 23c |
| ency   50 Hz | 18b | 23c | 18a | 23a |

Namely, in case of 60 Hz, the belt 27 is engaged with the pulley part 18b of the pulley 18 and with the pulley part 23e of the pulley 23 when the speed is 18 pictures per second while the belt 27 is engaged with the pulley part 18a of the pulley 18 and with the pulley part 23c of the pulley 23 in case the speed is 24 pictures per second. On the other hand, in case of 50 Hz, the belt 27 is engaged with the pulley part 18b of the pulley 18 and with the pulley part 23c of the pulley 23 in case the speed is 18 pictures per second while the belt 27 is engaged with the pulley part 18a of the pulley 18 and with the pulley part 23a of the pulley 23 when the speed is 24 pictures per second.

So far the present invention is explained for the case wherein the frequencies of the current source are 50 Hz and 60 Hz while the speeds are 18 pictures per second and 24 pictures per second. However, it goes without saying that whenever the above mentioned relation $S = r_n/R_n \cdot M$ is satisfied, other speeds can also be realized. In the present embodiment, the pulley 23 is moved along the shutter shaft 19 so as to adjust the speed influenced by the difference of the frequency while it is possible to the pulley 23 is fixed on the motor shaft 17, the pulley 18 be provided on the shutter shaft 19 and the diameters of various pulley parts be determined so as to obtain proper ratios whereby the proper speed independent of the frequency of the current source can be obtained.

Therefore, the claim of the present invention is not limited to the present invention only. As explained above, according to the present invention at least two film speeds can be obtained by changing the position of the belt. Namely, by translating at least one pulley along the shaft and changing the combination of the pulleys the change of the film speed as well as the adjustment of the rotation, speed influenced by the frequencies of the current source can be obtained so that the operation is quite simple further, the mechanism is quite simple and therefore the manufacturing cost is also low.

What is claimed is:

1. In a motion picture projection apparatus, the improvement comprising:
   1. a driving means having at least one AC motor which can use at least a first and a second power source having different frequencies,
   2. a first rotary shaft rotated by said driving means,
   3. a film feeding means,
   4. a second rotary shaft co-working with said film feeding means, and
   5. a power transmission correction means to transmit the rotation of said first rotary shaft to said second rotary shaft, being able to select rotational speeds of said second rotary shaft to prescribed values $M_1$ and $M_2$ and transmit the same even if said motor uses said first power source and the rotational speed of said first rotary shaft becomes $S_1$, and even if the motor uses said second power source and the rotational speed of said first rotary shaft becomes $S_2$, having:

a first pulley means having the following integrally rotating with said first rotary shaft:
   a first pulley having a diameter dimension formed as $r_1$, and
   a second pulley having a diameter dimension formed as $r_2$,
   a second pulley means having the following integrally rotating with said second rotary shaft:
   a first pulley having a diameter dimension $R_1$ formed as $R_1 = r_2 M_1 S_1$,
   a second pulley having a diameter dimension $R_2$ formed as $R_2 = r_2 M_1 S_1 = r_1 M_2 S_1$, and
   a third pulley having a diameter dimension $R_3$ formed as $R_3 = r_1 M_2 S_2$,
   a power transmission belt means having at least one or more endless belt disposed in tension
   a. between the second pulley of said first pulley means and the first pulley of said second pulley means when said motor uses said first power source and the rotational speed of said second rotary shaft is expected to be $M_1$;
   b. between the first pulley of said first pulley means and the second pulley of said second pulley means when said motor uses said first power source and the rotational speed of said second rotary shaft is expected to be $M_2$,
   c. between the second pulley of said first pulley means and the second pulley of said second pulley means when said motor uses said second power source and the rotational speed of said second rotary shaft is expected to be $M_1$, or
   d. between the first pulley of said first pulley means and the third pulley of said second pulley means when said motor uses said second power source and the rotational speed of said second rotary shaft is expected to be $M_2$, and
   a change over means to change over said tensioned position of said endless belt according to the type of the power source used by said motor and the rotational speed expected for said second rotary shaft, wherein said means can slidingly shift at least one of said endless belt and said second pulley means in the axial direction of said second rotary shaft.

2. An apparatus according to claim 1, in which said first power source has a frequency of 60 Hz while said second power source has a frequency of 50 Hz, and the rotational speed of said second rotary $M_1$ is 18 rotations per second while $M_2$ is 24 rotations per second, further the ratio of diameter dimensions between the first pulley and the second pulley of said first pulley means is set as $r_1 : r_2 = 1 : 0.9$, while the ratio of the diameter dimensions among the first pulley, the second pulley and the third pulley of said second pulley means is set as $R_1 : R_2 : R_3 = 1 : 1.2 : 1.44$.

3. An apparatus according to claim 1, in which said power transmission belt means has a means to remove sag between the first pulley means and the second pulley means of said endless belt.

4. An apparatus according to claim 1, in which said film feeding means has a film feeding claw member to intermittently feed film and cam member to control the action of said film feeding claw member, wherein said cam member is fixedly provided on said second rotary shaft that it rotates integrally with said second rotary shaft.

5. An apparatus according to claim 1 in which said motor is an induction motor.

6. In a motion picture projection apparatus, the improvement comprising:
  1. an AC motor which can use a first power source having a frequency of 60 Hz and a second power source having a frequency of 50 Hz, wherein said motor has a first rotary shaft which makes rotation of 7200/P per minute when said first power source is used and rotation of 6000/P per minute when said second power source is used, wherein said P represents the number of poles of said motor;
  2. a film feeding means:
  3. a second rotary shaft co-working with said film feeding means; and
  4. a power transmission correction means to so transmit the rotation of said first rotary shaft to said second rotary shaft that the rotational speed of said second rotating shaft can be selectively changed over between 18 rotations per second and 24 rotations per second and transmitted regardless of the rotational speed of said first rotary shaft whether it is 7200/P or 6000/P, having:
  a first pulley means having the following integrally rotating with said first rotary shaft:
    a first pulley having a diameter dimension formed to be $r_1$, and
    a second pulley having a diameter $r_2$ with a ratio of $0.9r_1$ against said diameter $r_1$ of the first pulley,
  a second pulley means having the following integrally rotating with said second rotary shaft:
    a first pulley having a diameter dimension $R_1$ formed as $R_1 = r_2 \cdot (P/100) \cdot 18$,
    a second pulley having a diameter dimension $R_2$ formed as $R_2 = r_2 \cdot (P/100) \cdot 24 = r_1 \cdot (120/P) \cdot 18$, and
    a third pulley having a diameter dimension $R_3$ formed as $R_3 = r_1 \cdot (120/P) \cdot 24$,
  a power transmission belt means having at least one or more endless belt to be disposed in tension
    a. between the second pulley of said first pulley means and the first pulley of said second pulley means when said motor uses said first power sources and the rotational speed of said second rotary is set as 18 rotations per second,
    b. between the first pulley of said first pulley means and the second pulley of said second pulley means when said motor uses said first power source and the rotational speed of said second rotary shaft is set as 24 rotations per second,
    c. between the second pulley of said first pulley means and the second pulley of said second pulley means when said motor uses said second power source and the rotational speed of said second rotary shaft is set at 18 rotations per second, or
    d. between the first pulley of said first pulley means and the third pulley of said second pulley means when said motor uses said second power source and the rotational speed of said second rotary shaft is set as 24 rotations per second, and
  a change over means to change over said tensioned position of said endless belt according to the type of the power source used by the motor and the number of rotations expected at said second rotary shaft, wherein said means can slidingly shift at least one out of said endless belt and said second pulley means in the axial direction of said second rotary shaft.

7. An apparatus according to claim 6, in which said power transmission belt means has a means to remove sag between the first pulley means and the second pulley means of said endless belt.

8. An apparatus according to claim 6, in which said film feeding means has a film feeding claw member to intermittently feed film and a cam member to control the action of said film feeding claw member, wherein said cam member rotates integrally with said second rotary shaft to have said film feeding claw member one cycle of film feeding while said second rotary shaft makes one rotation.

9. An apparatus according to claim 6, in which the first pulley and the second pulley of said first pulley means are connected by an inclined part and similarly connected are the first pulley and the second pulley of said second pulley means as well as the second pulley and the third pulley of the same means.

10. In a rotating power transmission device to transmit the rotation of a first rotary shaft to a second rotary shaft, the improvement comprising:
  1. a driving means having an AC motor to rotate said first rotary shaft, wherein said motor can selectively use at least a first and a second power source having different frequencies, said motor rotating said first rotary shaft with a rotational speed $S_1$ when said first power source is used, and rotating said first rotary shaft with a rotational speed $S_2$ when said second power source is used,
  2. a first pulley means which rotates integrally with said first rotary shaft, and has at least one pulley having a diameter formed with dimension r, and
  3. a power transmission correction means which transmits the rotation of said first rotary shaft to said second rotary shaft and holds the speed of rotation of said second rotary shaft always at M rotations per unit time, having:
  a second pulley means having the following which rotate integrally with said second rotary shaft:
    a first pulley having a diameter dimension $R_1$ formed to be $R_1 = rMS_1$, and
    a second pulley having a diameter dimension $R_2$ formed to be $R_2 = rMS_2$,
  a power transmission belt means to transmit the rotation of said first pulley means to said second pulley means, having at least one endless belt, which is disposed in tension between (a) the pulley of said first pulley means and the first pulley of said second pulley means when said motor uses the first power source, or between (b) the pulley of said first pulley means and the second pulley of said second pulley means when the motor uses the second power source, and a change over means to change over said tensioned position of said endless belt according to the type of the power source used by the motor, wherein said means can slidingly shift at least one of said endless belt and said second pulley means in the axial direction of said second rotary shaft.

11. In a rotating power transmission device to transmit the rotation of a first rotary shaft to a second rotary shaft, the improvement comprising:

1. a driving means having an AC motor to rotate said first rotary shaft, wherein said motor can use selectively at least a first and a second power source having different frequencies, said motor rotating said first rotary shaft with the rotational speed $S_1$ when said first power source is used, or (b) rotating said first rotary shaft with the rotational speed $S_2$ when said second power source is used, 2. a first pulley means integrally rotating with said second rotary shaft having at lease one pulley having a diameter dimension formed to R, and 3. a power transmission correction means to transmit the rotation of said first rotary shaft to said second rotary shaft and at the same time to retain the speed of rotation of said second rotary shaft always at M rotations per unit time, having:

a second pulley means having the following integrally rotating with said first rotary shaft:
  a first pulley having a diameter dimension $r_1$ formed as $r_1 = R/MS_1$, and
  a second pulley having a diameter dimension $r_2$ formed as $r_2 = R/MS_2$, a power transmission belt means to transmit the rotation of said second pulley means to said first pulley means, wherein said belt means has at least one endless belt being stretchedly spanned between (a) the pulley of said first pulley means and the first pulley of said second pulley means when said first power source is used by said motor, or between (b) the pulley of said first pulley means and the second pulley of said second pulley means when the motor uses said second power source, and a change over means to change said tensioned position of said endless belt according to the type of power source used by said motor, wherein said change over means can slidingly shift at least one of said endless belt and said second pulley means in the axial direction of said first rotary shaft.

12. In a rotating power transmission device to transmit the rotation of a first rotary shaft to a second rotary shaft so that said second rotary shaft can selectively make such speeds of rotation as $M_1$, $M_2$ rotations/unit time, the improvement comprising:

1. a driving means having an AC motor to rotate said first rotary shaft, wherein said motor can selectively use at least a first and a second power source having different frequencies, said motor rotating said first rotary shaft with rotational speed $S_1$ when said first power source is used, and rotating said first rotary shaft with a rotational speed $S_2$ when said second power source is used, and 2. a power transmission correction means to correct the variation in the rotational speed of said motor affected by the frequency of said power source used so that the rotational speed of said second rotary shaft can be selectively set at either $M_1$ or $M_2$ irrespective of the kind of the power source used by the motor, having:

a first pulley means having the following integrally rotating with said first rotary shaft:
  a first pulley having a diameter dimension of $r_1$,
  a second pulley having a diameter dimension of $r_2$, a second pulley means having the following integrally rotating with said second rotary shaft:
  a first pulley having a diameter dimension $R_1$ and formed so that $r_1 = r_2 M_1 S_1$,
  a second pulley having a diameter dimension $R_2$ and formed so that $R_2 = r_2 M_1 S_1$, and
  a third pulley having a diameter dimension $R_3$ and formed so that $R_3 = r_1 M_2 S_2$, a power transmission belt means to transmit the rotation of said first pulley means to said second pulley means, having at least one endless belt which can be disposed in tension a. between the second pulley of said first pulley means and the first pulley of said second pulley means when said motor uses said first power source and said second rotary shaft is expected to have $M_1$ rotations per unit time, b. between the first pulley of said first pulley means and the second pulley of said second pulley means when said motor uses said first power source and said second rotary shaft is expected to have $M_2$ rotations per unit time, c. between the second pulley of said first pulley means and the second pulley of said second pulley means when said motor uses said second power source and said second rotary shaft is expected to have $M_1$ rotations per unit time, or d. between the first pulley of said first pulley means and the third pulley of said second pulley means when said motor uses said second power source and said second rotary shaft is expected to have $M_2$ rotations per unit time, and a change over means to change over said tensioned position of said endless belt according to the type of the power source used by said motor and the rotational speed of said second rotary shaft, wherein said change over means can slidingly shift at least one of said endless belt and said second pulley means to axial direction of said second rotary shaft.

13. A rotating power transmission device according to claim 12, in which said first power source has a frequency of 60 Hz while said second power source has a frequency of 50 Hz, and the rotational speed $M_1$ of said second rotary shaft is 18 rotations per second while $M_2$ of the same is 24 rotations per second, further the ratio of diameter dimensions between the first pulley and the second pulley of said first pulley means is set as $r_1 : r_2 = 1 : 0.9$, while the ratio of diameter dimensions amont the first pulley, the second pulley, and the third pulley of said second pulley means is set as $R_1 : R_2 : R_3 = 1 : 1.2 : 1.44$.

14. A rotating power transmission device according to claim 12, in which said power transmission belt means has a means to remove sag between the first pulley means of said endless belt and the second pulley means of the same.

* * * * *